May 6, 1941.  A. H. COHEN  2,241,185
FOCUSING DEVICE FOR CAMERAS
Filed July 1, 1939
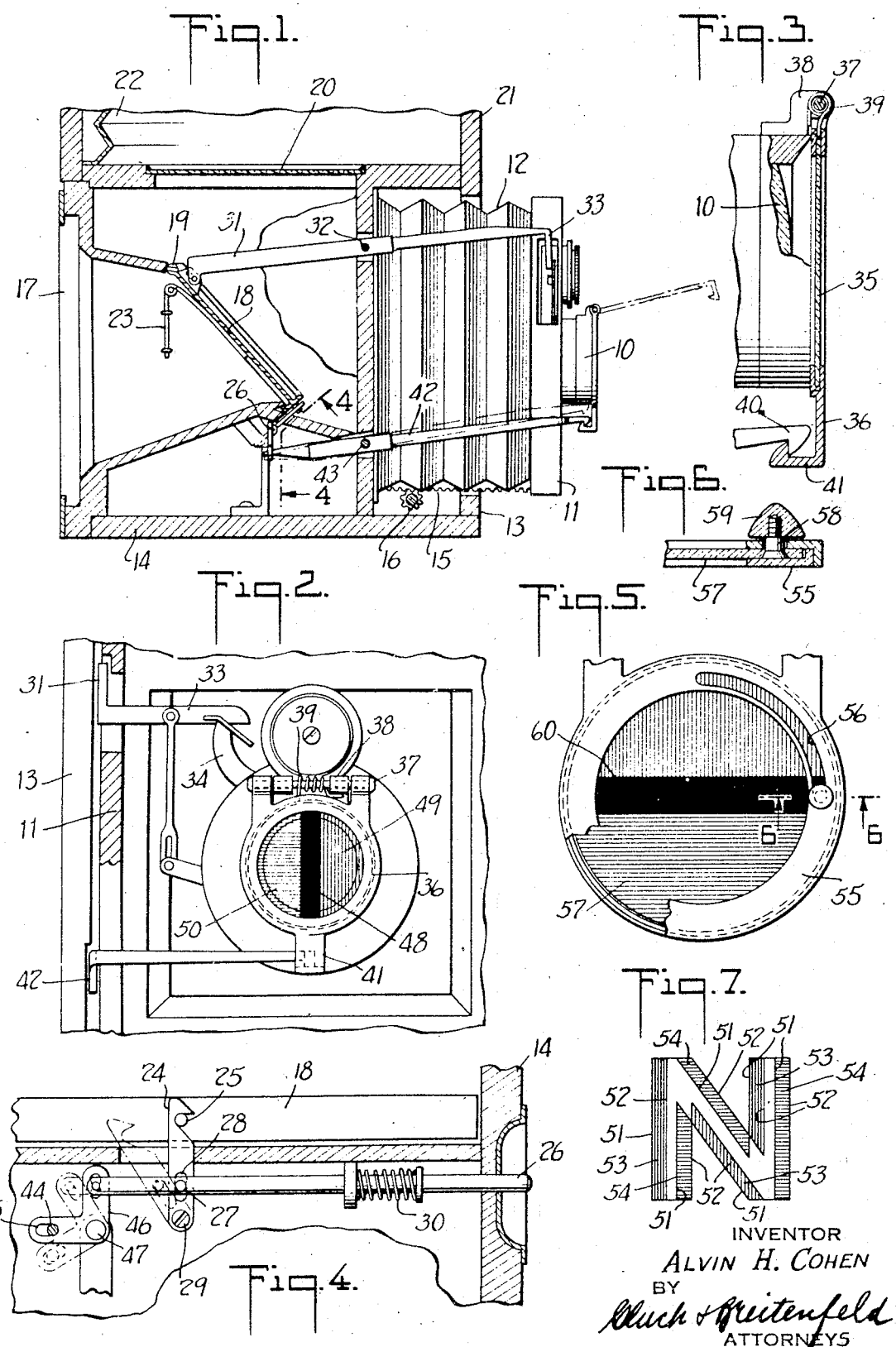
INVENTOR
ALVIN H. COHEN
BY
Cluck & Breitenfeld
ATTORNEYS Patented May 6, 1941

2,241,185

UNITED STATES PATENT OFFICE 2,241,185

FOCUSING DEVICE FOR CAMERAS

Alvin H. Cohen, New York, N. Y., assignor of one-half to Frederick L. Katz, New York, N. Y.

Application July 1, 1939, Serial No. 282,333

5 Claims. (Cl. 95—42)

My present invention relates generally to cameras, and has particular reference to a focusing device.

A general object of the invention is to provide a simple means for improving the accuracy with which the image cast by the camera lens may be brought to focus. The invention is predicated on the phenomenon whereby the blocking of light passage through a medial portion of a lens causes the lens to cast a multiple image except when it is in focus.

From a broad aspect, my invention consists of a lens adapted to cast an image upon a focusing plane, a means for increasing and decreasing the distance between the lens and the focusing plane, and a means for blocking the passage of light through at least one medial band portion of the lens. As a result, a multiple image is cast by the lens upon the focusing plane except when the lens is in focus. Accordingly, the person who is adjusting the lens, relative to the focusing plane, is assured that the lens is in accurate focus when the multiple image merges into a single image.

To further simplify the operation in bringing the lens into focus, I provide a means for imparting different chromatic qualities to the multiple images whereby the observer is more readily able to detect whether the multiple images have accurately merged into one, or whether the lens is still slightly out of focus.

Preferably, the chromatic qualities of the multiple images are of complementary character, whereby the merger of the images is accompanied by a complete neutralization of the colors of the separate images.

The blocking of the lens may be accomplished in various ways, but I prefer the relatively simple expedient of a filter adapted to be arranged over the lens and having at least one band portion of opaque character. For example, the filter may consist of a sheet or disc of transparent material, such as Celluloid or the like, and the opaque portion may be produced by pigmenting this material, or by applying an extra layer of opaque material. Where a filter of this type is resorted to, the chromatic effect may be conveniently produced by imparting different chromatic qualities to the filter portions on opposite sides of the opaque portion. Preferably, these qualities are of such a character that the light beams passing through one filter portion have a chromatic content which is complementary to that of the light beams passing through the other filter portion.

The application of the present focusing device to a camera may be accomplished in a variety of ways. For example, a lens independent of the objective lens of the camera may be so associated with the objective lens that movements of the former, relative to a focusing plane, are accompanied by corresponding movements of the latter. In such an event the filter or other light-blocking means may, if desired, be permanently associated with the lens. On the other hand, the objective lens itself may be utilized as the lens whose midportion is blocked against the passage of light. In such an event, I provide a means for rendering the light-blocking device inoperative after the lens has been brought into focus.

I achieve the foregoing objects and such other objects as may hereinafter appear or be pointed out, in the manner illustratively exemplified in the accompanying drawing, wherein—

Figure 1 is a longitudinal vertical cross section through a camera of the reflex type, embodying the features of the present invention, Figure 2 is a fragmentary front elevation of the camera, Figure 3 is an enlarged fragmentary cross-sectional view, taken substantially in the direction of Figure 1, showing certain preferred details of construction, Figure 4 is an enlarged cross-sectional view taken substantially along the line 4—4 of Figure 1, Figure 5 is a fragmentary front elevation of a preferred type of adjustable filter, shown by itself, Figure 6 is an enlarged fragmentary cross-sectional view taken substantially along the line 6—6 of Figure 5, and Figure 7 is a diagrammatic view intended to illustrate the merger of multiple images, as effected by the present invention.

Merely for illustrative purposes, and by way of example I have chosen to illustrate my invention applied to a simple camera of the reflex type. In this camera, the objective lens 10 is mounted on a lens board 11 at the forward end of a bellows 12, the latter being adapted to move inwardly and outwardly with respect to the forward wall 13 of a camera body 14. The movement of the bellows, and hence of the objective lens 12, is accomplished in the illustrated construction by means of a toothed rack 15 with which a pinion 16 engages, it being understood that the pinion is rotated by a control wheel or the like (not shown) accessible on the exterior of the camera.

At the rear of the camera body a receptacle 17 is adapted to receive the sensitized plate or film upon which the picture is to be taken. This receptacle may be of any suitable type, and although I have shown a device for receiving a film pack, it will be understood that accommodations for a roll film might be provided, if desired.

In a camera of this general type, there is a reflecting surface or mirror 18 arranged within the camera body and pivoted at 19, so that the mirror may be positioned, during the focusing process, in the position shown in Figure 1, and may be swung upwardly when the actual taking of the picture is to be effected. A ground glass 20, or its equivalent, is mounted in the upper wall of the camera body and a shield or hood 21, including, if desired, a collapsible bellows 22, is adapted to extend upwardly to permit the observer more clearly to see and examine the image that is cast upon the ground glass 20. It will be understood that, in the construction herein illustrated, this image is cast by the objective lens 10, as the result of the reflecting properties of the mirror 18.

Before describing the details of the present invention, I will point out that I have illustratively shown a spring 23 which constantly urges the mirror 18 into the inoperative position, while a latch 24 (see Figure 4) releasably engages a pin 25 to hold the mirror in the operative position shown in Figure 1. The release of the mirror may be accomplished by means of a release rod 26 provided with a pin 27 engaging within a slot 28 in the latch 24. This latch is pivoted as at 29 and is adapted to move into the dot-and-dash position of Figure 4 when the pin 26 is pushed toward the left against the urgence of the compression spring 30.

The pin 26 serves also as a shutter-actuator, by virtue of the fact that a lever 31 is associated at its rear end, by means of a pin-and-slot engagement, with the mirror 18, whereby the upward swinging of the mirror rocks the lever 31 in a clockwise direction around the pivot 32, thereby depressing the outer end 33 of the lever to actuate the shutter by means of the usual lever 34.

The mechanism thus far described is substantially the same as that illustrated and described in United States Patent No. 1,326,379, issued December 30, 1919.

One way of carrying out my present invention, in association with a camera of this type, is to mount a filter 35 in a frame 36, the latter being mounted on a pivot pin 37 carried by fixed brackets 38 alongside of the lens 10. The filter may be of any suitable or convenient type, preferably in the form of a thin disc of transparent material such as Celluloid or the like, and preferably substantially circular, as shown. A spring, such as the spring 39, constantly urges the frame 36 into the dot-and-dash position of Figure 1, while a releasable latch 40 engages a projecting hook 41 on the frame 36 (see Figure 3) to hold the filter in position over the lens 10. In the illustrated embodiment, the latch 40 is provided at the forward end of a lever 42, pivoted at 43, and having its rear end 44 arranged in a slot 45 of a bell crank lever 46. The latter is pivoted as at 47 and its other arm is in pin-and-slot engagement with the shutter-actuator rod 26. Accordingly, when the latter is manipulated, it not only releases the mirror 18 and actuates the shutter of the camera, but it also moves the lever 42 to release the filter 35 and allow the spring 39 to swing the filter into the inoperative dot-and-dash position shown in Figure 1. As described in the aforementioned Patent No. 1,326,379, the shutter of the camera is so constructed that it operates at the end of the downward movement of the lever 34. As a result, the mirror 18 has swung out of the way, and the filter 35 has also swung out of the way, by the time the shutter operates to expose the sensitized film.

Both the levers 31 and 42 are shown of telescopic construction to permit them to extend and contract pursuant to the movements of the bellows 12.

In accordance with my invention the filter 35 has a medial opaque band 48 which is shown in a vertical disposition in Figure 2. This band blocks the passage of light through a corresponding medial band portion of the objective lens 10, as a result of which a double image is cast by this lens with respect to the focusing plane in which the ground glass 20 is arranged, except when the lens is in focus. As the lens is brought into focus, by properly increasing or decreasing its distance from the focusing plane, the two images come more and more into superposed relation, and they ultimately merge completely into a single image when the lens is in accurate focus.

The filter portion 49, on one side of the band 48, is constructed in such a way that it has predetermined chromatic qualities, i. e., it passes light of predetermined chromatic content. The filter portion 50, on the other side of the band 48, is made to embody different chromatic qualities. As a result, the light-transmitting portions of the lens are constrained to pass light of predetermined different chromatic qualities, and the images produced by the lens are of different colors. This makes it much easier for the operator to bring the lens accurately into focus, because he knows that the lens is not in accurate focus as long as he detects these two colors in the composite image which he is viewing.

In accordance with my invention, these two colors are purposely made of complementary character. For example, the filter portion 49 may be adapted to pass a sort of yellow-red light, while the filter portion 50 may be made to pass a sort of blue-green light, or any other complementary colors may be resorted to, whereby the conjoint effect of these colors, wherever the images overlap, is to neutralize both colors and leave the resultant image entirely uncolored or of a neutral color.

This is illustrated in Figure 7 in which it is assumed that the camera is trained upon a capital letter N. Assuming further that the lens is not yet accurately in focus, the image bounded by the lines 51 may be assumed to be cast by the lens portion over which the filter portion 49 is arranged, and the image bounded by the lines 52 may be assumed to be cast by the lens portion covered by the filter portion 50. Wherever the images overlap, the two colors are neutralized, and when the lens is accurately in focus the capital letter N will appear entirely uncolored or of neutral color. As long as the lens is still out of focus, however, there will be areas 53 colored in accordance with the pigmentation of the filter portion 49, and there will be areas 54 colored in accordance with the pigmentation of the filter portion 50. The neutralization of these colors is a relatively simple thing to observe, while the lens is being focused, and in this way it is possible to bring the lens into very accurate focus.

Where the subject is characterized or dominated by horizontal lines rather than vertical lines, it might be desirable to have the opaque band arranged horizontally, instead of vertically, so that the colored portions of the image will correspond to the horizontal portions of the subject, as distinguished from the generally vertical colors illustratively shown in Figure 7. It will therefore be understood that the opaque band may be arranged either vertically or horizontally, or for that matter, at any desired angularity with respect to the horizontal. In fact, in view of the presence in every subject of some vertical dominating lines and some horizontal dominating lines, an opaque band arranged at approximately 45° to the horizontal may be found to be most desirable.

In Figures 5 and 6 I have shown a modification in which the angularity of the opaque band may be varied, to suit the photographer's needs or desires. In this case, the frame 55 is provided with a slot 56, and the filter 57 has a pin 58 extending through this slot and carrying a knob 59 which may be manipulated. The opaque band portion 60 is shown horizontal in Figure 5, but it may be swung into other angular positions by shifting the knob 59 in the slot 56. In this embodiment, as before, the filter portion on one side of the opaque band 60 has different chromatic qualities from the filter portion on the other side, and the different shade lines used in Figure 6 are intended to indicate this difference.

It will be understood that the filter may be provided with more than one opaque band. For example, it might be provided with a horizontal band and a vertical band, thereby leaving four quadrants of light-transmitting ability. In such an event, the lens would cast four overlapping images which would gradually merge into a single image as the lens is brought into accurate focus.

It will also be understood that the filter need not necessarily be pivotable, as shown in the present drawing, but might be mounted for swinging movements in its own plane; or it might be permanently arranged over a lens, but in such an event the lens would be one other than the objective lens of the camera.

Where a second lens is used, i. e., a lens independent of the camera objective, the medial band portion might be rendered opaque by pigmentation or by a mask applied directly to or within the lens, or a medial band portion of the lens might be completely cut away. Similarly, in such an event, the chromatic qualities of the light beams transmitted by the different portions of the lens might be effected by pigmentation of the lens material itself.

It will be understood that the camera herein illustrated is merely illustrative, and that my invention is by no means restricted to either this or any particular type of camera. The particular kind of shutter, or shutter-actuator, and the particular type of mirror and mirror-release, are all entirely immaterial so far as the broader phases of the present invention are concerned. Accordingly, it will be understood that changes in the details herein described and illustrated for the purpose of explaining the nature of my invention may be made by those skilled in the art without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is—

1. In a camera, an objective lens adapted to cast an image upon a focusing plane, means for increasing and decreasing the distance between said lens and the focusing plane, a shutter, a shutter-actuator, means movably mounted in alignment with the lens for blocking the passage of light through at least one medial band portion of the lens, whereby a multiple image is cast by said lens except when it is in focus, and means operable by the shutter-actuator and operatively interposed between the shutter-actuator and said blocking means for moving said blocking means into an inoperative position prior to the actuation of the shutter.

2. In a camera, the combination with the elements set forth in claim 2, of means for adjusting said blocking means to vary the angularity of said band relative to the horizontal.

3. In a camera, the combination of elements set forth in claim 1, said blocking means comprising an element hingedly mounted on the camera for swinging movement into and out of an operative position over said objective lens.

4. In a camera, the combination of elements set forth in claim 1, said blocking means comprising a filter provided with an opaque band portion, the filter portions on opposite sides of said opaque portion having predetermined different light-transmitting qualities adapted to permit passage, respectively, of light beams of predetermined different chromatic content.

5. In a camera, the combination of elements set forth in claim 1, said blocking means comprising a filter provided with an opaque band portion, the filter portions on opposite sides of said opaque portion having predetermined different light-transmitting qualities adapted to permit passage, respectively, of light beams of complementary chromatic content.

ALVIN H. COHEN.

CERTIFICATE OF CORRECTION.

Patent No. 2,241,185.                                         May 6, 1941.

ALVIN H. COHEN.

It is hereby certified that error appears in the printed specification of the above numbered patent requiring correction as follows: Page 3, second column, line 34, claim 2, for the claim reference numeral "2" read --1--; and that the said Letters Patent should be read with this correction therein that the same may conform to the record of the case in the Patent Office.

Signed and sealed this 10th day of June, A. D. 1941.

(Seal)

Henry Van Arsdale,
Acting Commissioner of Patents.